(12) United States Patent
Saini et al.

(10) Patent No.: US 11,792,658 B2
(45) Date of Patent: Oct. 17, 2023

(54) UPGRADING WIRELESS INFRASTRUCTURE THROUGH SCHEDULING

(71) Applicant: Cisco Technology, Inc., San Jose, CA (US)

(72) Inventors: Vinay Saini, Karnatka (IN); Ankush Ganpatrai Arora, Maharashtra (IN); Midhun Kumar Gundavarapu, Karnataka (IN); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 243 days.

(21) Appl. No.: 17/005,804

(22) Filed: Aug. 28, 2020

(65) Prior Publication Data

US 2022/0070692 A1    Mar. 3, 2022

(51) Int. Cl.
*H04W 24/02* (2009.01)
*H04W 48/02* (2009.01)
*H04W 36/38* (2009.01)
*H04W 36/22* (2009.01)
*H04L 67/00* (2022.01)
*H04W 36/00* (2009.01)
*H04W 76/28* (2018.01)
*H04W 52/14* (2009.01)
*H04W 84/12* (2009.01)

(52) U.S. Cl.
CPC ............ *H04W 24/02* (2013.01); *H04L 67/34* (2013.01); *H04W 36/00835* (2018.08); *H04W 36/22* (2013.01); *H04W 36/38* (2013.01); *H04W 48/02* (2013.01); *H04W 52/143* (2013.01); *H04W 76/28* (2018.02); *H04W 84/12* (2013.01)

(58) Field of Classification Search
CPC ... H04W 52/40; H04W 52/143; H04W 24/02; H04W 36/38; H04W 36/22; H04W 84/12; H04W 88/08; H04W 36/00835; H04W 36/08; H04W 36/18; H04W 36/0055; H04W 52/0216; H04W 48/02; H04W 76/28; H04W 76/20; H04W 28/10; H04L 67/34
See application file for complete search history.

(56) References Cited

U.S. PATENT DOCUMENTS

| | | | |
|---|---|---|---|
| 2005/0208944 A1* | 9/2005 | Okita | H04W 24/02 455/442 |
| 2007/0248033 A1* | 10/2007 | Bejerano | H04W 52/325 370/318 |

(Continued)

*Primary Examiner* — Ricardo H Castaneyra
(74) *Attorney, Agent, or Firm* — Merchant & Gould P.C.

(57) ABSTRACT

Wireless infrastructure upgrading may be provided. An Access Point (AP) may be caused to decline new association requests received from client devices not associated with the AP. Next, the AP may be caused to instruct client devices associated with the AP that detect a signal level from the AP to be below their roaming margin to roam away from the AP. Then the power of the signal level from the AP may be decreased by a predetermined amount. Causing the AP to instruct client devices associated with the AP that detect the signal level from the AP to be below their roaming margin to roam away from the AP and decreasing the power of the signal level from the AP may be repeated until the power of the signal level from the AP is at a predetermined level.

20 Claims, 6 Drawing Sheets

(56) References Cited

U.S. PATENT DOCUMENTS

| | | | |
|---|---|---|---|
| 2008/0181184 A1* | 7/2008 | Kezys | H04W 52/343 370/338 |
| 2012/0224484 A1* | 9/2012 | Babiarz | H04L 41/5019 370/235 |
| 2014/0112311 A1* | 4/2014 | Dayanandan | H04W 4/06 370/332 |
| 2016/0081031 A1* | 3/2016 | Barriac | H04L 43/08 370/311 |
| 2020/0396695 A1* | 12/2020 | Bhushan | H04W 52/34 |

* cited by examiner

UPGRADING WIRELESS INFRASTRUCTURE THROUGH SCHEDULING

TECHNICAL FIELD

The present disclosure relates generally to upgrading wireless infrastructure.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
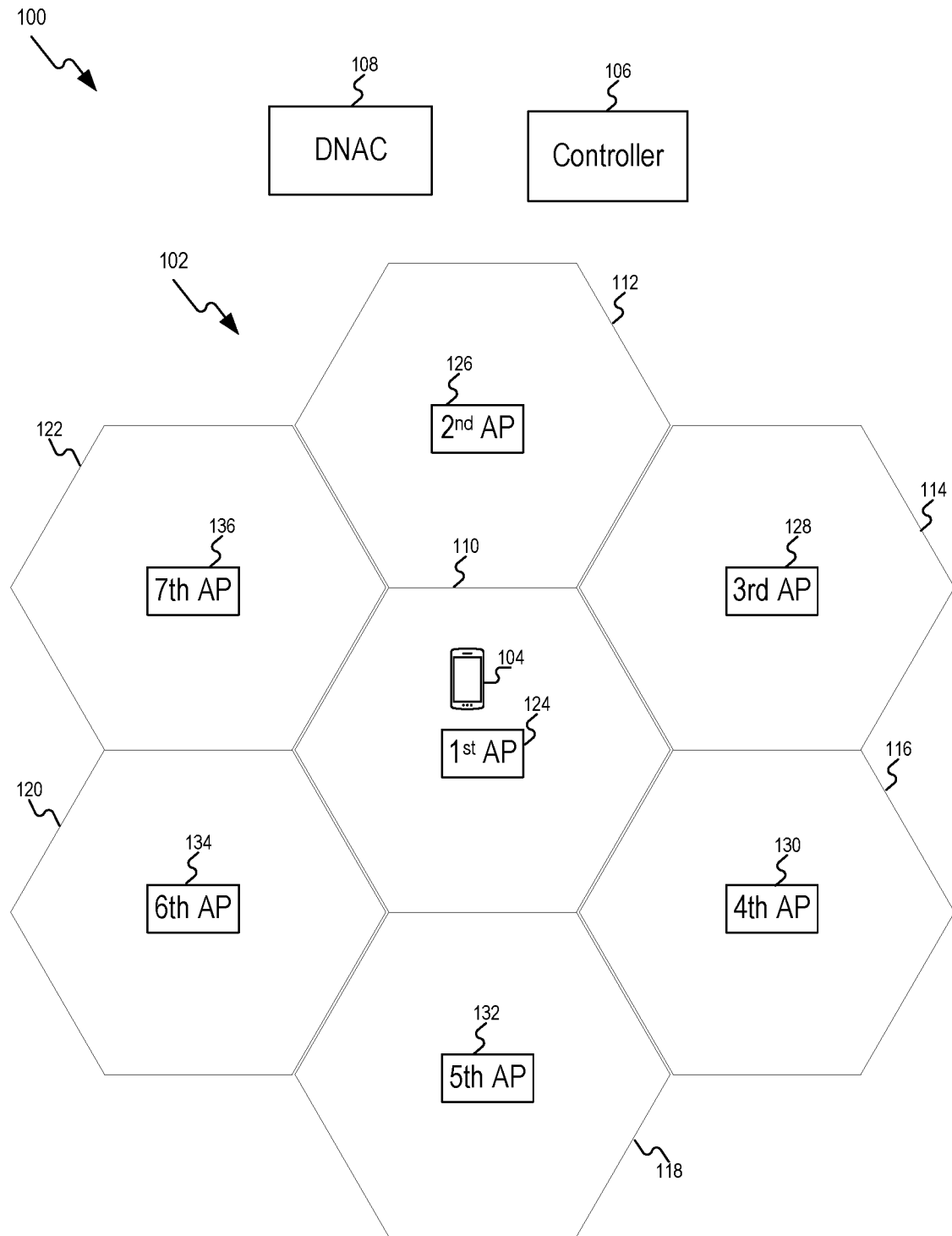
FIG. 1 is a block diagram of wireless network.

Wireless infrastructure upgrading may be provided. An Access Point (AP) may be caused to decline new association requests received from client devices not associated with the AP. Next, the AP may be caused to instruct client devices associated with the AP that detect a signal level from the AP to be below their roaming margin to roam away from the AP. Then the power of the signal level from the AP may be decreased by a predetermined amount. Causing the AP to instruct client devices associated with the AP that detect the signal level from the AP to be below their roaming margin to roam away from the AP and decreasing the power of the signal level from the AP may be repeated until the power of the signal level from the AP is at a predetermined level.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The software upgrade process on Wireless Local Area Network Controllers (WLCs) and Access Points (APs) may cause service downtime. With some features like smart upgrade or rolling upgrade, downtime duration may be reduced, but still present. In order to further limit client disruption, embodiments of the disclosure may consider the criticality of the data coming from client devices, the scheduled transmissions, and may plan the AP reboot or upgrade after a proper handover. Additionally, embodiments of the disclosure may evaluate client sensitivity to disruption and manage the reboot or upgrade plan accordingly.

Embodiments of the disclosure may provide wireless Infrastructure upgrades (e.g., including AP reboots) with a process orchestrated through a Digital Network Architecture Center (DNAC) controller (i.e., a Software-Defined Network (SDN) controller) that may consider the criticality of data transfers, Target Wake Time (TWT) schedules, client device traffic sensitivity to disruption, and the client device load before rebooting the AP's in an SDN deployment.

With Software-Defined Access (SDA) environments, AP traffic may be local (e.g., no central switching) and therefore Single Sign On (SSO) structures less common. As such, embodiments of the disclosure may orchestrate WLC upgrade (and reboot) in SDA environments. This is also valid in non-SDA environments where SSO is not instantiated (i.e., the AP may not be moved to another WLC while the WLC code is upgraded, and therefore upgrading the WLC may cause the WLC to reboot, and thus causing all APs to lose connectivity until they can rejoin that WLC. Additionally, in an upgrade process, once the WLC is upgraded, the new code may be pushed in advance to APs. However, this may require the APs to be rebooted, which may result in service downtime for the duration of the reboot if not planned carefully.

Embodiments of the disclosure may provide an SDN controller that, for example, may record details of TWT schedules and serving APs in a WiFi6 environment (that may be fetched from a Manufacturer Usage Descriptions (MUD) controller and/or a WLC) and also may record traffic sensitivity to accrued delays (i.e., increased TWTs). An SDN controller may use this information to modify AP upgrade schedules.

The SDN controller may record the criticality of the traffic based on elements such as marked Quality-of-Service (QoS) or MUD profile information per serving AP and may use this information to modify AP upgrade schedules. A residual-light map of a floor may be built so as to determine which APs may be relayed by others, and which APs may need individual management.

Once new code is pushed to the AP, the following decision points may be used to trigger the reboot: i) auto grouping of the AP may be done based on the service area (e.g., using the site maps in the SDN controller); ii) the SDN controller may check the TWT schedules and critical traffic flowing through an AP or not in a given site map/Floor; and iii) an AP neighbor list may be used to identify nearest APs. A residual-light test may validate the client disruption and may schedule upgrades accordingly.

AP upgrades may be scheduled to minimize client device traffic. As such, one process may observe the APs on a given floor, and start by upgrading the APs with no client devices. Next, the process may evaluate areas where APs may be redundant (e.g., a temporal reboot of an AP does not affect coverage, as client devices may connect to another AP). For such zones, the process may attempt to steer client devices temporarily away from APs that may be planned for reboot.

Next the process may be left with minimal disruption, for example, disruption for client devices that do not react to steering triggers (e.g., Institute of Electrical and Electronics Engineers (IEEE) 802.11k/v messages) and for APs that may not have redundant neighbors. For example, client devices connected to an AP may have no reason to roam to another AP upon an 802.11k/v trigger if the current connection is satisfactory. As such, the effect of the 802.11k/v trigger may only appear when the AP reboots (i.e., allowing the client device to know which backup AP to move to), which may still bring disruption to the client device's traffic. Embodiments of the disclosure may provide a process that may minimize disruption after APs with no client devices have been upgraded and APs with redundant neighbors have been identified.

Consistent with embodiments of the disclosure, an SDN controller may improve Application Visibility and Control (AVC) by associating a delay sensitivity value to each application type. In particular, some applications may require packets distributed at specific intervals. For example, voice Real-time Transport (RTP) may use one packet at a 20 ms interval. As the transmission rate increases, larger intervals may become acceptable (e.g., 2 packets representing 40 ms of audio may be sent in a burst of 1.5 ms duration). However, excessive intervals may result in dropped packets (e.g., the inability to access the medium for more than 100 ms may cause the application to drop the older packet in the queue). By contrast, the effect of delay on other applications (e.g., video) may cause the application to change its compression ratio, thus adapting to the delay. Similarly, other applications (e.g., transactional data) may tolerate longer starvation.

Embodiments of the disclosure may convert the aforementioned delay sensitivity to TWT elasticity. For example, the SDN controller may record that a client device running a particular RTP audio flow cannot be requested to sleep for more than 100 ms and should not be interrupted for more than 100 ms (e.g., because of a roaming event). A client device running a particular Constrained Application Protocol (CoAP) traffic may, by contrast, be requested to sleep for up to 15 minutes, traffic is elastic (L4 retries), etc. Such TWT elasticity profile may thus be associated to each application known to the AVC.

TWT may comprise a negotiation and a client device may or may not accept the AP schedule. Therefore, the TWT sensitivity may comprise two elements as described above: i) a sleep delay tolerance (i.e., how long a client device may be requested to sleep); and ii) a delay sensitivity (i.e., what is the impact of a client device sending traffic, is the frame retried, dropped, is there an upper layer retry mechanism). These two elements may be recorded on a scale where the values of the scale may be implementation-dependent.

Once a TWT elasticity profile is established, embodiments of the disclosure may manage client device traffic through the AP software update/reboot phase. The SDN controller may record the traffic on each AP. Updates (from APs/WLCs to SDN controller) may happen at intervals (e.g., 15 mins). By exception, the SDN controller may send an AP update warning, causing the APs to report passing traffic AVC metadata at shorter intervals. The update cycle may then be orchestrated and managed by the SDN controller, depending on the AP and its client device's characteristics as described in greater detail below.

FIG. 1 shows a block diagram of wireless network 100 for upgrading wireless infrastructure. As shown in FIG. 1, wireless network 100 may comprise a plurality of cells 102 in which a client device 104 may roam. Plurality of cells 102 may have a corresponding plurality of wireless Access Points (APs) that may establish a Wireless Local Area Network (WLAN) in order to provide client device 104 network connectivity. While one client device 104 is shown in FIG. 1, a plurality of client devices may be used in conjunction with system 100.

Site specific policies may be provisioned on a Wireless Local Area Network controller (WLC) 106 for the plurality of APs to join wireless network 100 and to allow WLC 106 to control wireless network 100. Consistent with embodiments of the disclosure, a Digital Network Architecture Center (DNAC) controller 108 (i.e., a Software-Defined Network (SDN) controller) may configure information for wireless network 100 in order to provide location tracking consent management consistent with embodiments of the disclosure.

Plurality of cells 102 may comprise a first cell 110, a second cell 112, a third cell 114, a fourth cell 116, a fifth cell 118, a sixth cell 120, and a seventh cell 122. First cell 110 may correspond to a first AP 124, second cell 112 may correspond to a second AP 126, third cell 114 may correspond to a third AP 128, fourth cell 116 may correspond to a fourth AP 130, fifth cell 118 may correspond to a fifth AP 132, sixth cell 120 may correspond to a sixth AP 134, and seventh cell 122 may correspond to a seventh AP 136.

As stated above, wireless network 100 may comprise Wi-Fi APs that may be configured to support a wireless (e.g., Wi-Fi) hotspot. The Wi-Fi hotspot may comprise a physical location where a user, operating client device 104, may obtain access to wireless network 100 (e.g., Internet access), using Wi-Fi technology, via a WLAN using a router connected to a service provider.

In other embodiments of the disclosure, rather than APs, devices may be used that may be connected to a cellular network that may communicate directly and wirelessly with end use devices (e.g., client device 104) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

Client device 104 may comprise, but is not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of wireless network 100 (e.g., WLC 106, DNAC 108, first AP 124, second AP 126, third AP 128, fourth AP 130, fifth AP 132, sixth AP 134, and seventh AP 136) may be practiced in hardware and/or in software (including firmware, resident software, microcode, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of wireless network 100 may be practiced in a computing device 600.

Figure 2:
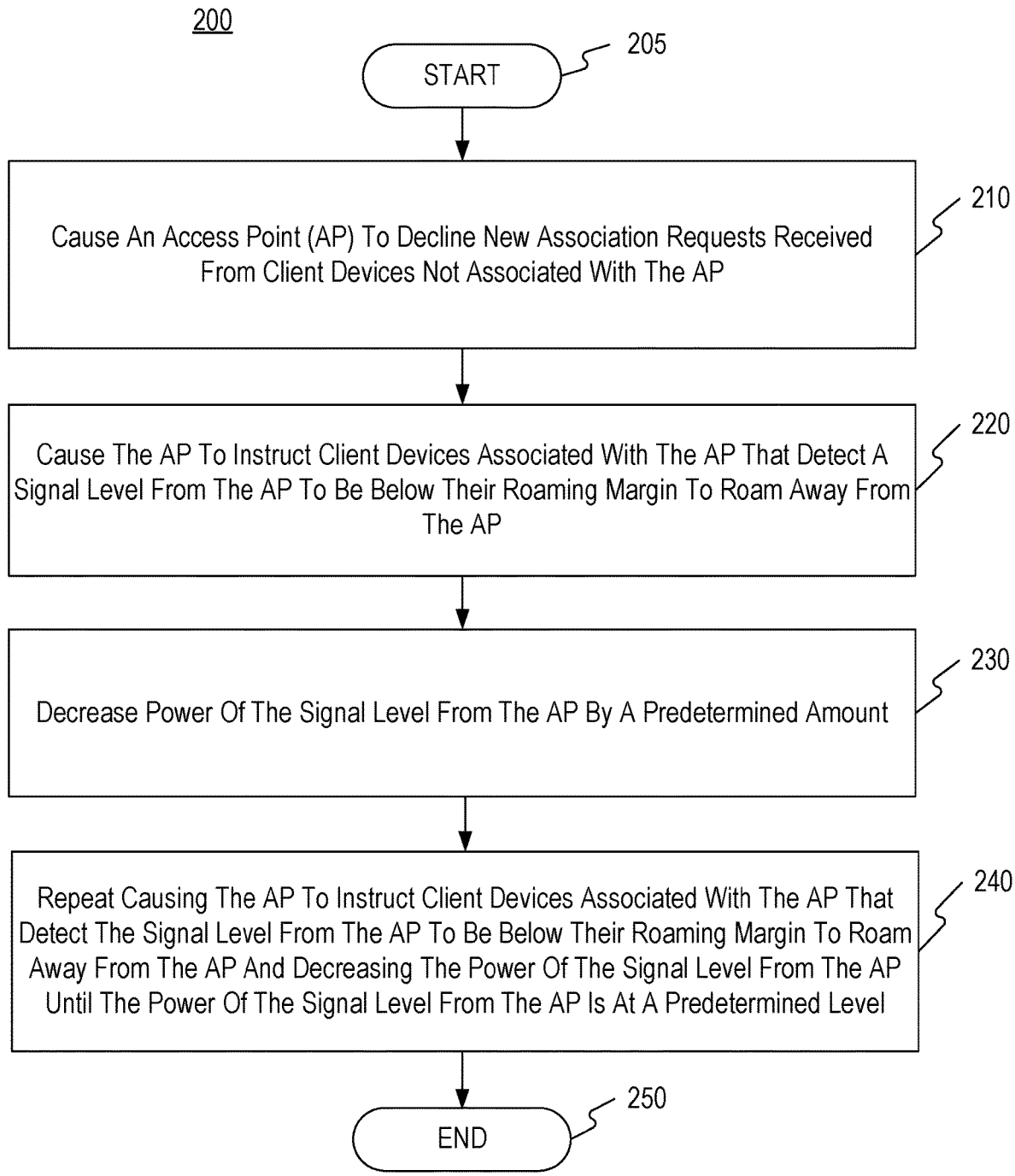
FIG. 2 is a flow chart of a method for providing wireless infrastructure upgrades for systems with Access Points (APs) having client devices with noncritical traffic.

FIG. 2 is a flow chart setting forth the general stages involved in a method 200 consistent with embodiments of the disclosure for providing wireless infrastructure upgrades for systems with APs that may have client devices with noncritical traffic. Method 200 may be implemented using computing device 600 as described in more detail below with respect to FIG. 6. Ways to implement the stages of method 200 will be described in greater detail below.

Method 200 may begin at starting block 205 and proceed to stage 210 where computing device 600 (e.g., WLC 106 or DNAC 108) may cause an Access Point (AP) (e.g., first AP 124) to decline new association requests received from client devices not associated with the AP. For example, if first AP 124 has clients that are not sending priority traffic (i.e., all traffic displays medium/high delay sensitivity) first AP 124 may start by declining new association requests. In other words, first AP 124 may stop processing/serving any new client devices, not responding to probe requests, and declining associations (e.g., reason code 5). Protection mechanisms may be in place, for example, if a client device repeats an association request three times or more, it may be accepted to avoid blacklisting side effects.

From stage 210, where computing device 600 (e.g., WLC 106 or DNAC 108) causes first AP 124 to decline new association requests received from client devices not associated with first AP 124, method 200 may advance to stage 220 where computing device 600 may cause first AP 124 to instruct client devices associated with first AP 124 that detect a signal level from first AP 124 to be below their roaming margin to roam away from first AP 124. For example, as a candidate AP for upgrade (e.g., first AP 124) is detected in an environment with redundant neighbor APs, the candidate AP may be set by WLC 106 or DNAC 108 to send to its n weakest client devices (e.g., those at the edge of first cell 110) a Basic Service Set (BSS) Transition Management (BTM) message. This may be applied to edge client devices because they may be the ones likely to want to roam, thus saving airtime.

Once computing device 600 causes first AP 124 to instruct client devices associated with first AP 124 that detect a signal level from first AP 124 to be below their roaming margin to roam away from first AP 124 in stage 220, method 200 may continue to stage 230 where computing device 600 may decrease power of the signal level from first AP 124 by a predetermined amount. For example, first AP 124 may be set by WLC 106 or DNAC 108 to decrease its power by one level (e.g., 3 dBm).

After computing device 600 decreases power of the signal level from first AP 124 by the predetermined amount in stage 230, method 200 may proceed to stage 240 where computing device 600 may repeat: i) causing first AP 124 to instruct client devices associated with first AP 124 that detect the signal level from first AP 124 to be below their roaming margin to roam away from first AP 124 and; ii) decreasing the power of the signal level from first AP 124 until the power of the signal level from first AP 124 is at a predetermined level. For example, first AP 124 may then repeat its BTM message as described above. The cycle may repeat at an interval until first AP 124's radio is at a minimal power level. Client devices may therefore be pushed to roam by gradually detecting that first AP 124's signal level gets below their roaming margin.

Even at the aforementioned minimal power level, there may be some client devices left still associated with first AP 124, close to first AP 124, still in "good enough" range of first AP 124 from their standpoint. In this case, because these client devices may have medium/high delay tolerance, first AP 124 may start to increase the acceptance interval for each client device's packets, thus causing an increasing rate of retries, and triggering these remaining client device's shifting mechanisms. After this, any remaining client devices may be idle or non-transmitting.

Once the active client devices are moved, first AP 124 may reboot. When first AP 124 with updated code comes back up, it may be positioned on an "updated" list. The above process may be repeated for every AP in wireless network 100.

Once computing device 600 repeats: i) causing first AP 124 to instruct client devices associated with first AP 124 that detect the signal level from first AP 124 to be below their roaming margin to roam away from first AP 124; and ii) decreasing the power of the signal level from first AP 124 until the power of the signal level from first AP 124 is at a predetermined level in stage 240, method 200 may then end at stage 250.

Figure 3:
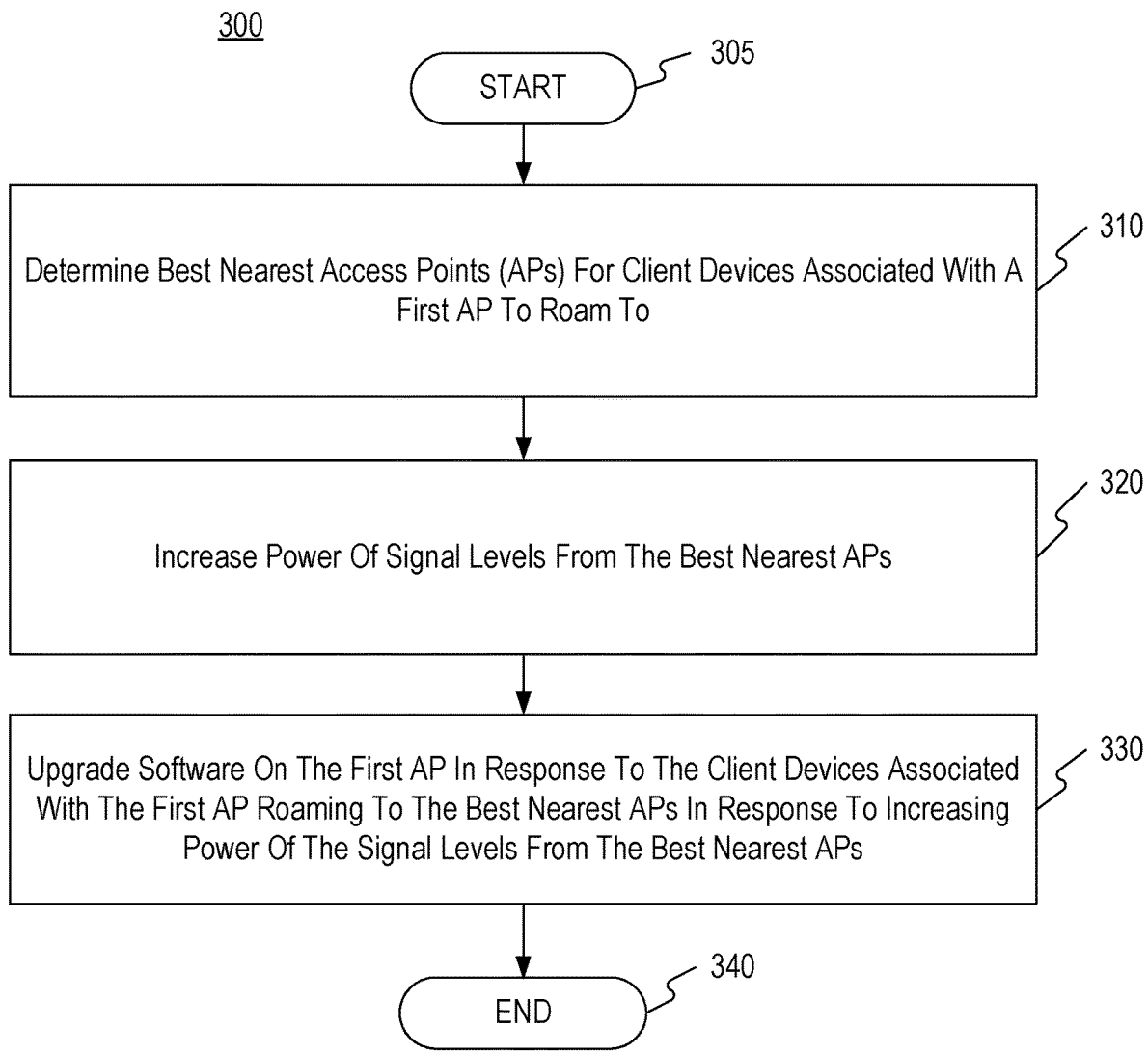
FIG. 3 is a flow chart of a method for providing wireless infrastructure upgrades for systems with APs having client devices with critical traffic.

FIG. 3 is a flow chart setting forth the general stages involved in a method 300 consistent with embodiments of the disclosure for providing wireless infrastructure upgrades for systems with APs that may have client devices with critical traffic. Critical traffic may comprise, but is not limited to, voice traffic, video traffic, virtual reality, augmented reality, sensor information traffic, and industrial protocols traffic. Method 300 may be implemented using computing device 600 as described in more detail below with respect to FIG. 6. Ways to implement the stages of method 300 will be described in greater detail below.

Method 300 may begin at starting block 305 and proceed to stage 310 where computing device 600 (e.g., WLC 106 or DNAC 108) may determine best nearest Access Points (APs) for client devices associated with first AP 124 to roam to. For example, WLC 106 or DNAC 108 may look for an AP close by within the neighbor table. Client devices in each quadrant of a cell (e.g., first cell 110) may be matched against a different alternate AP. Based on the Received Signal Strength Indicators (RSSIs) in the neighbor table, the best nearest AP may be identified and client devices may be pushed to roam to the new AP. These client devices may be targeted and may be put on a watch list communicated to the neighbor APs. These neighbor APs may report probes received from these client devices. Accordingly, client devices that scanned and attempted to roam, but reverted back to the original AP, may be identified. For these client devices, a wait interval may be applied to let the client devices recover from the disruption caused by scanning for example.

From stage 310, where computing device 600 may determine best nearest Access Points (APs) for client devices associated with first AP 124 to roam to, method 300 may advance to stage 320 where computing device 600 may increase power of signal levels from the best nearest APs. For example, WLC 106 or DNAC 108 may increase the power of the neighbor AP reporting the strongest probe signal for the client devices and the process repeats. Accordingly, the client devices may end up detecting the neighboring AP at a higher signal than the local AP (e.g., first AP 124), and thus triggering the roam process. As with method 200, the AP introduces, if some clients are left, delay in its responses to the remaining client devices, but within the detected applications delay tolerance. The AP may also introduce a session timer that may be communicated to client devices (e.g., IEEE 802.11v message). The session timer may be set to be long enough to allow a normal flow to complete (e.g., 1 hour). Upon the end of the session, the AP may not accept the client device, forcing the client device to roam.

Once computing device 600 increases the power of signal levels from the best nearest APs in stage 320, method 300 may continue to stage 330 where computing device 600 may upgrade software on first AP 124 in response to the client devices associated with first AP 124 roaming to the best nearest APs in response to increasing power of the signal levels from the best nearest APs. For example, AP 124 may be upgraded once all the clients have moved to another AP. Once computing device 600 upgrades software on first AP 124 in stage 330, method 300 may then end at stage 340.

Figure 4:
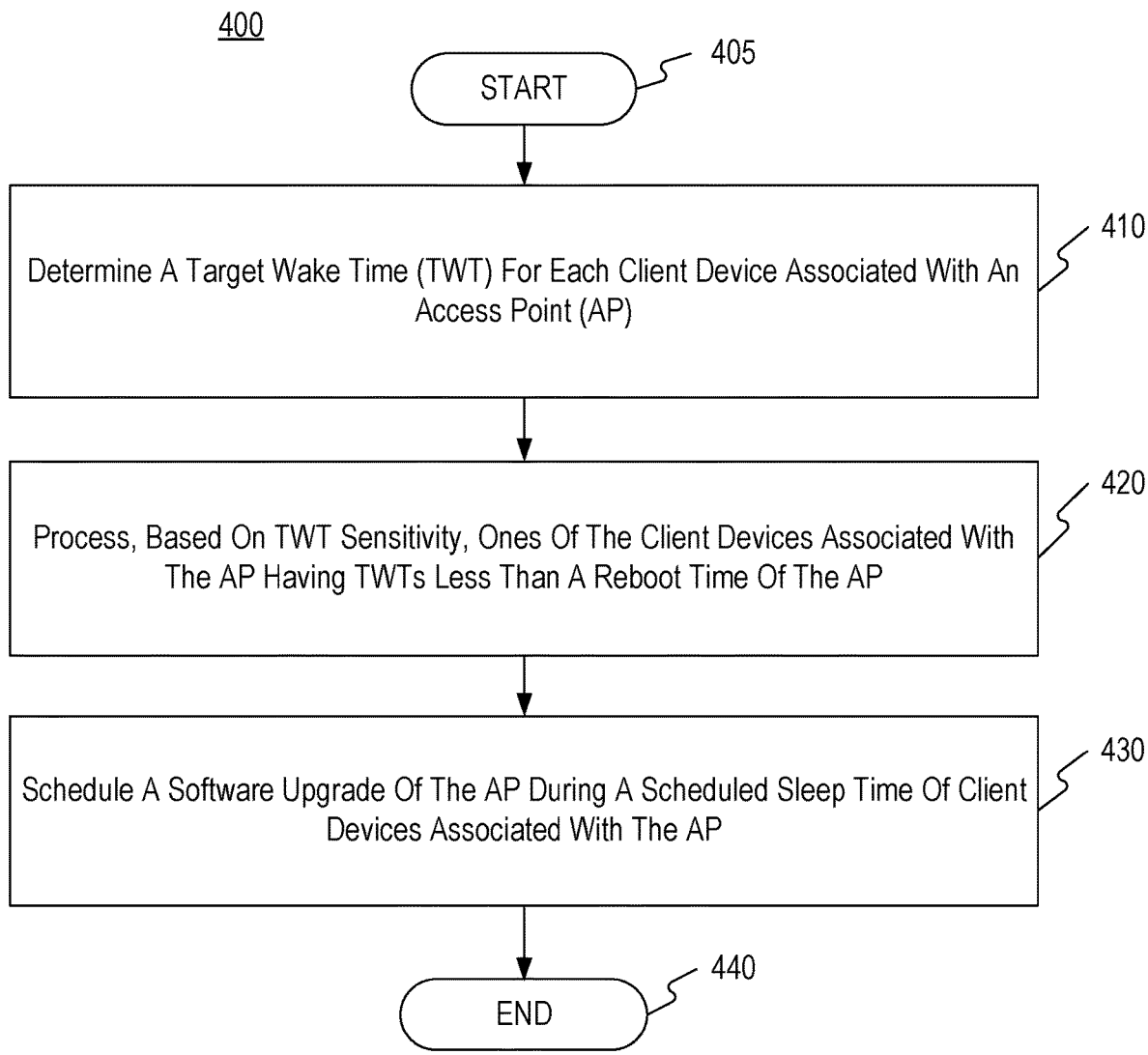
FIG. 4 is a flow chart of a method for providing wireless infrastructure upgrades for systems with APs having client devices with Target Wake Time (TWT)/sleeping client devices.

FIG. 4 is a flow chart setting forth the general stages involved in a method 400 consistent with embodiments of the disclosure for providing wireless infrastructure upgrades for systems with APs that may have client devices with Target Wake Time (TWT)/sleeping client devices. Method 400 may be implemented using computing device 600 as described in more detail below with respect to FIG. 6. Ways to implement the stages of method 400 will be described in greater detail below.

Method 400 may begin at starting block 405 and proceed to stage 410 where computing device 600 (e.g., WLC 106 or DNAC 108) may determine a Target Wake Time (TWT) for each client device associated with an AP (e.g., first AP 124). For example, WLC 106 or DNAC 108 may monitor the TWT schedules of the client devices and sensors associated with first AP 124. WLC 106 or DNAC 108 may also have the details of the reboot times (i.e., how long before an AP of this model has rebooted) for every AP model deployed in wireless network 100.

From stage 410, where computing device 600 determines the TWT for each client device associated with first AP 124, method 400 may advance to stage 420 where computing device 600 may process, based on TWT sensitivity, ones of the client devices associated with first AP 124 having TWTs less than a reboot time of first AP 124. For example, client devices having a TWT less than the AP reboot time of first AP 124 may be classified based on their TWT sensitivity. Client devices with high TWT sensitivity or devices that may have been observed as ignoring the AP TWT overrides may be moved to another identified nearest AP, for example, using method 200 or method 300 as described above. Client devices with low TWT sensitivity (and that may respond to AP TWT overrides) may receive an increasing TWT value until it exceeds the AP reboot time. Client devices having TWT greater than the AP reboot time may be grouped and scheduled to sleep at the same time as the AP reboot.

Once computing device 600 processes, based on TWT sensitivity, ones of the client devices associated with first AP 124 having TWTs less than the reboot time of first AP 124 in stage 420, method 400 may continue to stage 430 where computing device 600 may schedule a software upgrade of first AP 124 during a scheduled sleep time of client devices associated with first AP 124. For example, the AP may reboot with the upgraded code. WLC 106 or DNAC 108 may then reinject the client session information (state etc.) to the AP. When the client devices awake, they may continue their session with the AP (e.g., unaware of the reboot). Once computing device 600 schedules the software upgrade of first AP 124 during the scheduled sleep time of client devices associated with first AP 124 in stage 430, method 400 may then end at stage 440.

Figure 5:
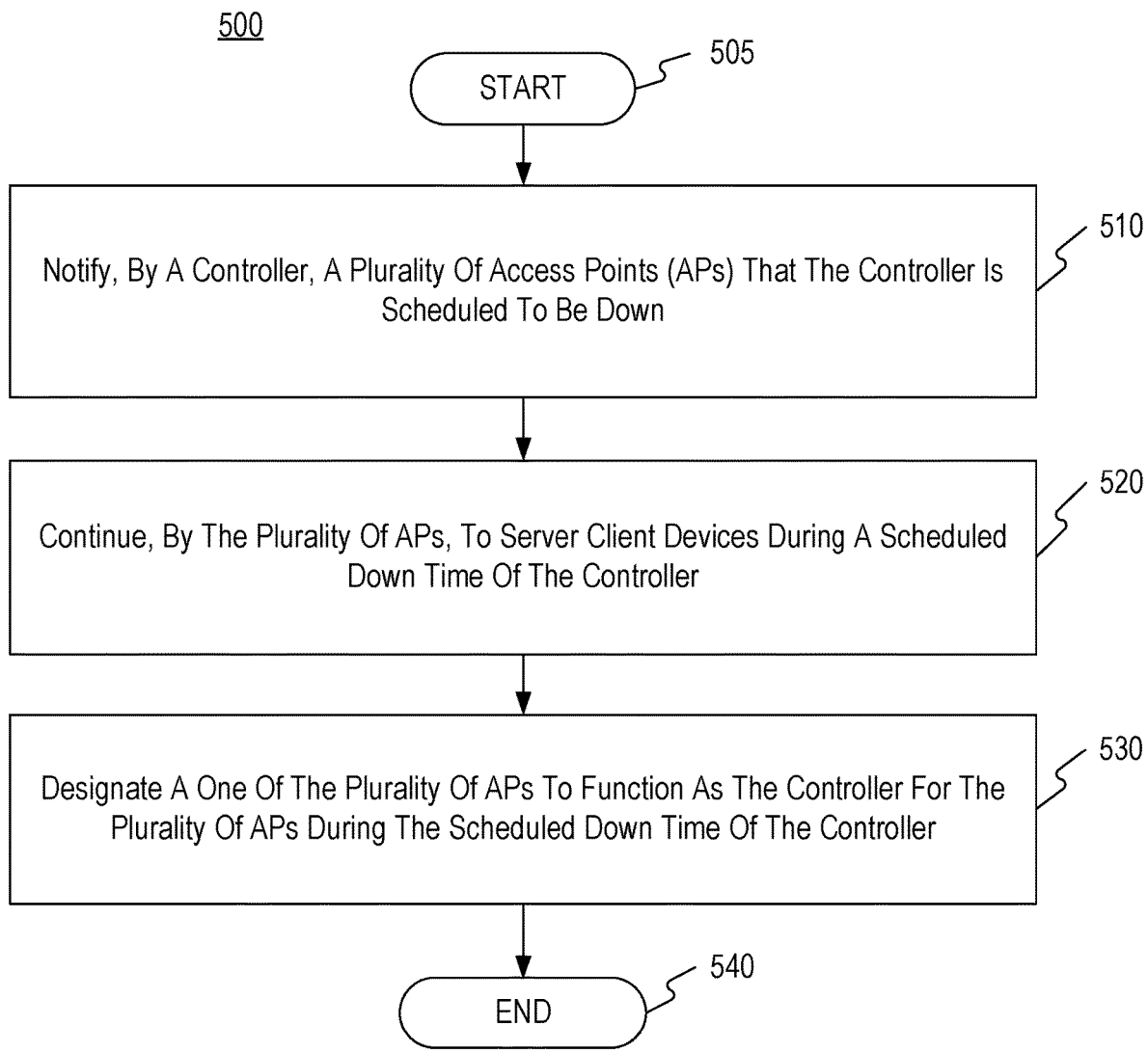
FIG. 5 is a flow chart of a method for providing Wireless Local Area Network Controller (WLC) upgrades.

FIG. 5 is a flow chart setting forth the general stages involved in a method 500 consistent with embodiments of the disclosure for providing Wireless Local Area Network controller (WLC) upgrades. Method 500 may be implemented using computing device 600 (e.g., WLC 106 or DNAC 108) as described in more detail below with respect to FIG. 6. Ways to implement the stages of method 500 will be described in greater detail below.

In Software-Defined Access wireless, most of the traffic may be locally switched using the Virtual Extensible Local Area Network (VXLAN) from the APs. Accordingly, WLC 106 may be rebooted with minimal impact on the client device traffic. However, unreachability of WLC 106 during the reboot may push the APs to search for another WLC, which may disrupt client device traffic flow. Method 500, for example, may be used to avoid any dependency on WLC 106 unreachable during a code upgrade or a planned reboot.

Method 500 may begin at starting block 505 and proceed to stage 510 where WLC 106 may notify a plurality of APs in wireless network 100 that WLC 106 is scheduled to be down. For example, WLC 106 may notify the APs in wireless network 100 of its scheduled reboot/downtime for code upgrade. This may be done with a message sent via a Control and Provisioning of Wireless Access Points protocol (CAPWAP) control channel with the expected downtime (e.g., based on AP model reboot time).

From stage 510, where WLC 106 may notify the plurality of APs in wireless network 100 that WLC 106 is scheduled to be down, method 500 may advance to stage 520 where the plurality of APs may continue to server client devices during a scheduled down time of WLC 106. For example, the plurality of APs may not track the heartbeat/echo misses during this period and may continue to serve their existing client devices. The configuration may comprise, for example, an "ignore no response for x seconds", or "heartbeat interval is increased to value y" (e.g., where y may be larger than WLC 106's reboot time).

Once the plurality of APs continue to server client devices during the scheduled down time of WLC 106 in stage 520, method 500 may continue to stage 530 where WLC 106 may designate a one of the plurality of APs to function as the controller for the plurality of APs during the scheduled down time of WLC 106. For example, in one embodiment, the APs may be grouped (e.g., by location, VXLAN mapping or other structure), and one the APs may take the additional role of Mobility Express (ME) AP for the duration of WLC 106's reboot. In this ME mode, any of the new client device association that may need WLC validation (e.g., Pre-Shared Key (PSK) or IEEE 802.1x clients) may be temporarily served by the ME AP that may assume the temporary role of providing WLC functionality. All new associations may be forwarded to the ME AP for the duration of WLC 106's reboot. Once WLC 106's is up again after its reboot, WLC 106 may update all the AP's in wireless network 100. The AP's in wireless network 100 may then start tracking the heartbeats and the ME AP may give the control of wireless network 100 back to WLC 106, also forwarding the new client entries to WLC 106.

With this embodiment of the disclosure, the problem of residual client disruption may be mitigated. WLC 106 and APs in wireless network 100 may be updated and client consideration may be extended beyond mere presence, to also integrate the problem of client type, client behavior, traffic type, and associated sensitivity to traffic disruption. Once WLC 106 designates the one of the plurality of APs to function as the controller for the plurality of APs during the scheduled down time of WLC 106 in stage 530, method 500 may then end at stage 540.

Figure 6:
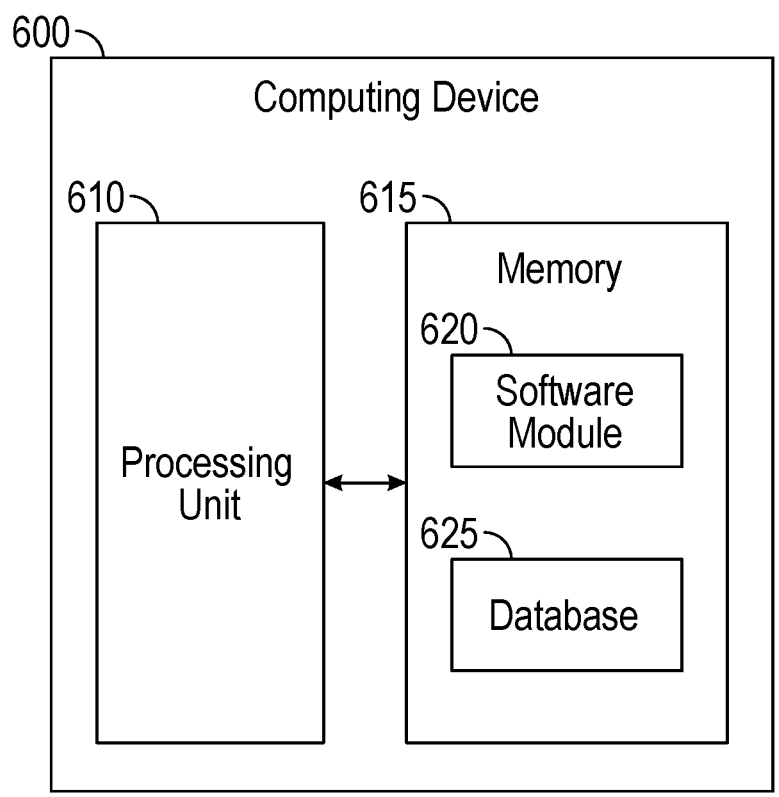
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for upgrading wireless infrastructure as described above with respect to FIG. 2, FIG. 3, FIG. 4, and FIG. 5. Computing device 600, for example, may provide an operating environment for WLC 106, DNAC 108, first AP 124, second AP 126, third AP 128, fourth AP 130, fifth AP 132, sixth AP 134, or seventh AP 136. WLC 106, DNAC 108, first AP 124, second AP 126, third AP 128, fourth AP 130, fifth AP 132, sixth AP 134, and seventh AP 136 may operate in other environments and are not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   causing an Access Point (AP) to decline new association requests received from client devices not associated with the AP;
   causing the AP to instruct client devices associated with the AP that detect a signal level from the AP to be below their roaming margin to roam away from the AP;
   decreasing, after causing the AP to instruct client devices associated with the AP that detect the signal level from the AP to be below their roaming margin to roam away from the AP, power of the signal level from the AP by a predetermined amount;
   repeating causing, after decreasing the power of the signal level from the AP by the predetermined amount, the AP to instruct client devices associated with the AP that detect the signal level from the AP to be below their roaming margin to roam away from the AP and decreasing, after causing the AP to instruct client devices associated with the AP that detect the signal level from the AP to be below their roaming margin to roam away from the AP, the power of the signal level from the AP until the power of the signal level from the AP is at a predetermined level;
   increasing, when one or more active client devices remain associated with the AP when the power of the signal level from the AP is at the predetermined level, an acceptance interval for packets from the client devices that remain associated with the AP when the power of the signal level from the AP is at the predetermined level; and
   rebooting, after repeating and increasing the acceptance interval, and when active client devices are moved from the AP, the AP.

2. The method of claim 1, further comprising upgrading software on the AP.

3. The method of claim 1, wherein the AP is processing only non-critical traffic.

4. The method of claim 1, wherein the predetermined amount comprises 3 dBm.

5. The method of claim 1, wherein causing the AP to instruct the client devices associated with the AP to roam away from the AP comprises causing the AP to send a Basic Service Set (BSS) Transition Management (BTM) message.

6. The method of claim 1, further comprising positioning, after rebooting the AP, the AP on an updated list.

7. The method of claim 1, further comprising determining, before causing the AP to decline the new association requests received from client devices not associated with the AP, that the AP is a redundant AP.

8. The method of claim 1, further comprising upgrading, before causing the AP to decline the new association requests received from client devices not associated with the AP, upgrading software on an another AP with no client devices.

9. The method of claim 1, further comprising identifying, before causing the AP to decline the new association requests received from client devices not associated with the AP, a redundant neighbor AP to the AP.

10. A system comprising:
    a memory storage; and
    a processing unit, the processing unit coupled to the memory storage, wherein the processing unit is operative to:
       cause an Access Point (AP) to decline new association requests received from client devices not associated with the AP;
       cause the AP to instruct client devices associated with the AP that detect a signal level from the AP to be below their roaming margin to roam away from the AP;
       decrease, after causing the AP to instruct client devices associated with the AP that detect the signal level from the AP to be below their roaming margin to roam away from the AP, power of the signal level from the AP by a predetermined amount;
       repeat causing, after decreasing the power of the signal level from the AP by the predetermined amount, the AP to instruct client devices associated with the AP that detect the signal level from the AP to be below their roaming margin to roam away from the AP and decrease, after causing the AP to instruct client devices associated with the AP that detect the signal level from the AP to be below their roaming margin to roam away from the AP, the power of the signal level from the AP until the power of the signal level from the AP is at a predetermined level;
       increase, when one or more client devices remain associated with the AP when the power of the signal level from the AP is at the predetermined level, an acceptance interval for packets from the client devices that remain associated with the AP when the power of the signal level from the AP is at the predetermined level; and
       reboot, after repeating and increasing the acceptance interval, and when active client devices are moved from the AP, the AP.

11. The system of claim 10, wherein the processing unit is further operative to upgrade software on the AP after rebooting.

12. The system of claim 10, wherein the AP is processing only non-critical traffic.

13. The system of claim 10, wherein the predetermined amount comprises 3 dBm.

14. The system of claim 10, wherein the processing unit being operative to cause the AP to instruct the client devices associated with the AP to roam away from the AP comprises the processing unit being operative to cause the AP to send a Basic Service Set (BSS) Transition Management (BTM) message.

15. The system of claim 10, wherein the processing unit is further operative to position, after rebooting the AP, the AP on an updated list.

16. A non-transitory computer-readable medium that stores a set of instructions which when executed perform a method comprising:
    causing an Access Point (AP) to decline new association requests received from client devices not associated with the AP;
    causing the AP to instruct client devices associated with the AP that detect a signal level from the AP to be below their roaming margin to roam away from the AP;
    decreasing, after causing the AP to instruct client devices associated with the AP that detect the signal level from the AP to be below their roaming margin to roam away from the AP, power of the signal level from the AP by a predetermined amount; and
    repeating causing, after decreasing the power of the signal level from the AP by the predetermined amount, the AP to instruct client devices associated with the AP that detect the signal level from the AP to be below their roaming margin to roam away from the AP and decreasing, after causing the AP to instruct client devices associated with the AP that detect the signal level from the AP to be below their roaming margin to roam away from the AP, the power of the signal level from the AP until the power of the signal level from the AP is at a predetermined level;
    increasing, when one or more client devices remain associated with the AP when the power of the signal level from the AP is at the predetermined level, an acceptance interval for packets from the client devices that remain associated with the AP when the power of the signal level from the AP is at the predetermined level; and
    rebooting, after repeating and increasing the acceptance interval, and when active client devices are moved from the AP, the AP.

17. The non-transitory computer-readable medium of claim 16, further comprising upgrading software on the AP after rebooting the AP.

18. The non-transitory computer-readable medium of claim 16, wherein the AP is processing only non-critical traffic.

19. The non-transitory computer-readable medium of claim 16, wherein causing the AP to instruct the client devices associated with the AP to roam away from the AP comprises causing the AP to send a Basic Service Set (BSS) Transition Management (BTM) message.

20. The non-transitory computer-readable medium of claim 16, further comprising positioning, after rebooting the AP, the AP on an updated list.

* * * * *